United States Patent
Shi et al.

(10) Patent No.: US 7,415,155 B2
(45) Date of Patent: Aug. 19, 2008

(54) METHODS AND APPARATUS FOR REVERSIBLE DATA HIDING THROUGH HISTOGRAM MODIFICATION

(75) Inventors: Yun-Qing Shi, Millburn, NJ (US); Zhi-Cheng Ni, Kearny, NJ (US); Nirwan Ansari, Montville, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1025 days.

(21) Appl. No.: 10/823,086

(22) Filed: Apr. 12, 2004

(65) Prior Publication Data

US 2004/0223627 A1 Nov. 11, 2004

Related U.S. Application Data

(60) Provisional application No. 60/549,424, filed on Mar. 2, 2004, provisional application No. 60/468,243, filed on May 6, 2003.

(51) Int. Cl.
*G06K 9/00* (2006.01)

(52) U.S. Cl. ..................................... 382/169

(58) Field of Classification Search ................ 382/100, 382/232, 168–172; 380/54, 210, 254, 287; 713/176; 358/3.28; 704/200.1, 273; 381/73.1; 370/527, 529; 348/672
See application file for complete search history.

(56) References Cited

U.S. PATENT DOCUMENTS

| | | | | |
|---|---|---|---|---|
| 5,930,369 A | * | 7/1999 | Cox et al. ..................... 380/54 |
| 6,125,201 A | * | 9/2000 | Zador ........................... 382/166 |
| 6,278,791 B1 | | 8/2001 | Honsinger et al. | |
| 6,483,927 B2 | * | 11/2002 | Brunk et al. ................ 382/100 |
| 6,580,809 B2 | * | 6/2003 | Stach et al. .................. 382/100 |
| 6,650,762 B2 | * | 11/2003 | Gibson et al. ............... 382/100 |
| 6,971,013 B2 | * | 11/2005 | Mihcak et al. .............. 713/180 |
| 7,106,882 B2 | * | 9/2006 | Kamijo ........................ 382/100 |
| 2003/0081809 A1 | | 5/2003 | Fridrich et al. | |

FOREIGN PATENT DOCUMENTS

WO PCT/US04/11331 12/2005

OTHER PUBLICATIONS

Ingemar J. Cox et al., Secure Spread Spectrum Watermarking For Multimedia, IEEE Transactions On Image Processing, Dec. 1997, pp. 1673-1687, vol. 6, No. 12.

Jiwu Huang et al., Adaptive Image Watermarking Scheme Based on Visual Masking, Electronics Letters, Apr. 16, 1998, pp. 748-750, vol. 34, No. 8.

J. Irvine et al., The Security Prespective, Data Communications and Networks: An Engineering Approach, 2002, pp. 31-53.

Brian Chen et al., Quantization Index Modulation: A Class of Provably Good Methods for Digital Watermarking and Information Embedding, IEEE Transactions on Information.

(Continued)

*Primary Examiner*—Jose L Couso
(74) *Attorney, Agent, or Firm*—Connolly Bove Lodge & Hutz LLP

(57) ABSTRACT

Methods and apparatus are provided for encoding a pixel domain image with hidden data by modifying the histogram of the pixel domain image to make space for such hidden data.

51 Claims, 8 Drawing Sheets

OTHER PUBLICATIONS

Theory, May 2001, pp. 1423-1443, vol. 47, No. 4.

Jiri Fridrich et al., Invertible Authentication, Center for Intelligent System, Department of Electrical Engineering, Jan. 2001, pp. 1-12.

B. Marq et al., Trusted Headers for Medical Images, DFG VIII-D II Watermarking Workshop, Oct. 1999, pp. 1-13.

W. Bender et al., Techniques for Data Hiding, IBM Systems Journal, 1996, pp. 313-336, vol. 35, Nos. 3&4.

C. DeVleeschouwer et al., Circular Interpretation of Histogram for Reversible Watermarking, IEEE International Multimedia Signal Processing Workshop, Oct. 2001, pp. 345-350.

Miroslav Goljan et al., Distortion-Free Data Embedding for Images, Proceedings of 4th Information Hiding Workshop, Apr. 2001, pp. 1-15.

M. U. Celik et al., Reversible Data Hiding, Proceedings of IEEE 2002 International Conference on Image Processing, Sep. 2002, pp. 157-160, vol. 2.

Jun Tian, Reversible Data Embedding Using a Difference Expansion, IEEE Transactions on Circuits and Systems for Video Technology, Aug. 2003, pp. 890-896, vol. 13, No. 8.

* cited by examiner

NJIT
FIG. 4
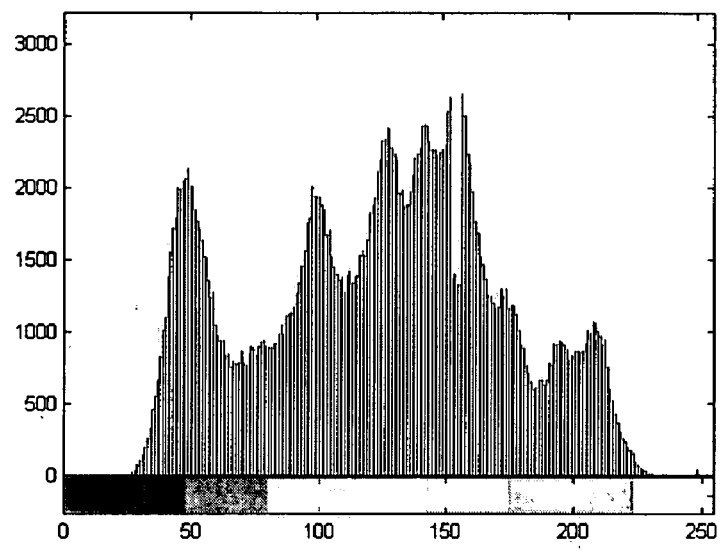
FIG. 5
FIG. 6

| Images (512x512x8) | PSNR of marked image (dB) | Capacity (bits) |
|---|---|---|
| Lena | 48.2 | 5,460 |
| Airplane | 48.3 | 16,171 |
| Tiffany | 48.2 | 8,782 |
| Jet | 48.7 | 59,979 |
| Baboon | 48.2 | 5,421 |
| Pepper | 48.2 | 5,449 |
| Sailboat | 48.2 | 7,301 |
| House | 48.3 | 14,310 |
| Bacteria | 48.2 | 13,579 |
| Blood | 48.2 | 79,460 |

FIG. 13

| Methods | The amount of data embedded in a 512 × 512 × 8 image | PSNR of marked image (dB) |
|---|---|---|
| Macq's | <2,046 bits | Not mentioned |
| Goljan's* | 3k-24k bits | 39 |
| Xuan's | 26k-105k bits | 25-42 |
| Ours | 5k-80k bits | >48 |

FIG. 14

METHODS AND APPARATUS FOR REVERSIBLE DATA HIDING THROUGH HISTOGRAM MODIFICATION

CROSS REFERENCE TO RELATED APPLICATIONS

This application claims the benefit of U.S. Provisional Patent Application No. 60/468,243, entitled Lossless Image Data Hiding Through Histogram Modification Implemented in Spatial Domain, filed May 6, 2003, and U.S. Provisional Patent Application No. 60/549,424, entitled Reversible Data Hiding, filed Mar. 2, 2004; the entire disclosures of which are hereby incorporated by reference.

BACKGROUND

This application is directed to methods and apparatus for data hiding in an image and, more particularly, to lossless and reversible data hiding in the spatial domain.

In the field of data hiding, pieces of information represented by the data are hidden in the cover media (e.g., a pixel image). In other words, the data hiding process links two sets of data, a set of the embedded data and another set of the cover media data. The relationship between these two sets of data defines different applications. For instance in covert communications, the hidden data are irrelevant to the cover media. In authentication, however, the embedded data are closely related to the cover media. In these types of applications, invisibility of hidden data is an important requirement. In most cases, the cover media will experience some distortion due to data hiding and cannot be inverted back to the original media. Indeed, some permanent distortion occurs to the cover media even after the hidden data have been extracted.

In some applications, such as medical diagnosis and law enforcement, it is desirable to reverse the marked media back to the original cover media after the hidden data are retrieved for consideration. The marking techniques satisfying this requirement are referred to as reversible, lossless, distortion-free, or invertible data hiding techniques. Reversible data hiding links two sets of data in such a way that the cover media can be losslessly recovered after the hidden data have been extracted. This provides an additional avenue of handling the two different sets of data.

Many of the existing data hiding techniques are not reversible. For instance, widely utilized spread-spectrum based data hiding methods have been disclosed in the following publications: J. Cox, J. Kilian, T. Leighton, and T. Shamoon, "Secure Spread Spectrum Watermarking for Multimedia," IEEE Trans. on Image Processing, Vol. 6, No. 12, pp. 1673-1687 (December 1997); and J. Huang and Y. Q. Shi, "An Adaptive Image Watermarking Scheme Based on Visual Masking," Electronics letters, 34(8): 748-750 (1998). These techniques, however, are not invertible owing to truncation (for the purpose to prevent over/underflow) error, and round-off error.

Another well-known least significant bit-plane (LSB) approach is discussed in J. Irvine and D. Harle, Data Communications and Networks: An Engineering Approach, West Sussex, England: John Wiley & Sons, Ltd. (2002). This approach is not lossless owing to bit-replacement without "memory."

Another category of data hiding techniques is quantization-index-modulation (QIM), which is discussed in detail in B. Chen and G. W. Wornell, "Quantization Index Modulation: A Class of Provably Good Methods for Digital Watermarking and Information Embedding," IEEE Transactions on Information Theory, Vol. 47, No. 4, pp. 1423-1443 (May 2001). This technique is not distortion-free owing to the quantization error.

Although most of the current digital watermarking algorithms are not lossless, some recent marking techniques have been reported as being lossless. For example, two methods carried out in the image spatial domain purport to be lossless. The details of these methods may be found in U.S. Pat. No. 6,278,791 (the entire disclosure of which is hereby incorporated by reference) and J. Fridrich, M. Goljan and R. Du, "Invertible Authentication," Proc. SPIE, Security and Watermarking of Multimedia Contents, pp. 197-208, San Jose, Calif., (January. 2001). In the '791 patent, the marking is carried out in the spatial domain. The method uses modulo 256 addition to embed a hash value of an original image for authentication. The technique is reversible because of the modulo 256 addition; however, the modulo 256 addition also may produce some annoying salt-and-pepper noise due to grayscale flipping over between 0 and 255 in either direction. The Fridrich approach also operates in the spatial domain and losslessly compresses some selected bit-plane(s) to leave space for data embedding. Since bookkeeping data are also embedded as overhead, the method is reversible. The amount of hidden data, however, is quite limited because the bias between binary bits, 0s and 1s (the tendecy the have more 0's or more 1's in the data) is not significant in the several lower levels that include the least significant bit-plane (LSB) in the spatial domain. The lack of bias was probably not a problem in the Fridrich approach because it is directed towards data authentication instead of data embedding.

A purportedly lossless marking technique has also been developed in the transform domain, as is discussed in detail in B. Macq and F. Deweyand, "Trusted Headers For Medical Images," DFG VIII-D II Watermarking Workshop, Erlangen, Germany, (October. 1999). This reversible marking technique was developed in the transform domain and is based on a lossless multi-resolution transform and the patchwork theory. It also uses modulo 256 addition. Since each block, say, an 8×8 block can only be used to embed one bit, the amount of hidden data that may be achieved is quite limited. More details concerning the patchwork theory may be found in W. Bender, D. Gruhl, N. Morimoto and A. Lu, "Techniques for Data Hiding," IBM Systems Journal, Vol. 35, No. 3-4, pp. 313-336 (1996).

Yet another marking technique is discussed in detail in C. De Vleeschouwer, J. F. Delaigle and B. Macq, "Circular Interpretation on Histogram for Reversible Watermarking," IEEE International Multimedia Signal Processing Workshop, France, pp. 345-350 (October 2001). The capacity of this method, which is based on the idea of patchwork and modulo 256 addition, is also limited except that it is expected to exhibit some robustness against high quality JPEG compression.

A reversible marking technique that is suitable for a large amount of hidden data is discussed in detail in M. Goljan, J. Fridrich, and R. Du, "Distortion-free Data Embedding," Proceedings of $4^{th}$ Information Hiding Workshop, pp. 27-41, Pittsburgh, Pa., (April 2001), also in U.S. patent application Ser. No.: 2003/0081809 (the entire disclosure of which is hereby incorporated by reference). The amount of hidden data achievable by this technique, however, is still not large enough for many applications, such as medical applications. Indeed, the pay-load ranges from 3,000 bits to 24,000 bits for a 512×512×8 grayscale image, i.e., from 0.011 bits per pixel (bpp) to 0.092 bpp as the PSNR of the marked image versus the original image is 39 dB. This technique first segments an image into non-overlapped blocks, and then introduces a discriminating function to classify these blocks into three groups: R(egular), S(ingular) and U(nusable). It further introduces a flipping operation, which can convert an R block to an S block and vice versa. A U block remains intact after the flipping operation. By assigning, say, a binary 1 to an R block and a binary 0 to an S block, all R and S blocks are scanned in a chosen sequential order, resulting in a binary sequence. This binary sequence is losslessly compressed and the compressed sequence is saved as overhead for late reconstruction of the original image. In data embedding, the R and S blocks are scanned once again and the flipping operation is applied whenever necessary to make the changed R and S block sequence coincident with the to-be-embedded data (another binary 0 and 1 bit stream) followed by the overhead data. While successful in reversible data hiding, the payload is still not large enough for some applications, as indicated above. Another problem with the method is that when the embedding strength increases in order to increase payload, the visual quality drops severely due to annoying artifacts.

To increase payload dramatically, a new lossless data hiding technique based on integer wavelet transform is discussed in detail in U.S. patent application Ser. No.: 60/527,900, filed Dec. 5, 2003, entitled Methods and Apparatus for Lossless Data Hiding, the entire disclosure of which is hereby incorporated by reference. Because of the superior decorrelation capability of the wavelet transform, the selected bit-plane compression in high frequency subbands creates more space for data hiding, resulting in a higher payload than that in the method described in U.S. patent application Ser. No.: 2003/0081809. Specifically, for a 512×512×8 image, 5,000 bits to 80,000 bits can be embedded, i.e., the payload is from 0.019 bpp to 0.31 bpp while the PSNR of the marked image versus the original image is guaranteed above 48 dB. In addition, the integer wavelet transform, a second generation wavelet transform, helps to avoid round-off error. To achieve reversible data hiding, a histogram modification is applied during pre-processing to prevent over/underflow. This histogram modification causes, however, a lower PSNR of the marked image versus the original image though there are no annoying artifacts.

It is noted that reversible data hiding has attracted more and more attention recently and more and more algorithms are being developed. Another example is the technique reported in M. U. Celik, G. Sharma, A. M. Tekalp and E. Saber, "Reversible Data Hiding," Proceedings of IEEE 2002 International Conference on Image Processing, Vol. 2, pp. 157-160 (September 2002). Still a further example is the technique reported in J. Tian, "Reversible Data Embedding Using a Difference Expansion," IEEE Transactions on Circuits and Systems for Video Technology, vol. 13, no. 8, pp. 890-896, August 2003.

Accordingly, there are needs in the art for new methods and apparatus for achieving lossless marking that can embed a relatively large amount of data, while keeping a high visual quality of the marked images.

SUMMARY OF THE INVENTION

In accordance with one or more aspects of the present invention, a reversible data embedding technique is contemplated that may embed a relatively large amount of data (e.g., about 5K to 80K bits for a 512×512×8 grayscale image, equivalent to a payload from 0.019 bpp to 0.31 bpp) while keeping a very high visual quality (e.g., the PSNR of the marked image versus original image is at least 48 dB). The approach utilizes a zero or minimum point and a peak point of a histogram of the image to be marked and slightly modifies the pixel value to embed the data. The technique can be applied to virtually all types of images.

In accordance with one or more further aspects of the present invention, provides for methods and apparatus that are capable of: producing a histogram from a pixel domain image, the histogram establishing a relationship of possible pixel values versus respective aggregate numbers of pixels of the pixel domain image having such pixel values; modifying some of the pixel values of the pixel domain image to shift a portion of the histogram such that there no longer exists an aggregate number of pixels having a first possible pixel value; and modifying some of the pixel values of the pixel domain image such that an aggregate number of pixels exist having the first possible pixel value, where the aggregate number of pixels is a function of the data to be hidden.

In accordance with one or more further aspects of the present invention, the methods and apparatus for marking images described thus far and/or described later in this document, may be achieved utilizing suitable hardware, such as that shown in the drawings hereinbelow. Such hardware may be implemented utilizing any of the known technologies, such as standard digital circuitry, analog circuitry, any of the known processors that are operable to execute software and/or firmware programs, one or more programmable digital devices or systems, such as programmable read only memories (PROMs), programmable array logic devices (PALs), any combination of the above, etc. Further, the methods of the present invention may be embodied in a software program that may be stored on any of the known or hereinafter developed media.

Other aspects, features and advantages of the present invention will become apparent to those skilled in the art when the description herein is taken in conjunction with the accompanying drawing.

BRIEF DESCRIPTION OF THE DRAWING

For the purposes of illustration, there are forms shown in the drawings that are presently preferred, it being understood, however, that the invention is not limited to the precise arrangements and instrumentalities shown.

FIG. 4 is an illustration of exemplary data to be hidden in an original pixel domain image in accordance with one or more aspects of the present invention;

FIG. 5 is an illustration of a modified histogram of the original pixel domain image of FIG. 3 in accordance with one or more aspects of the present invention;

FIG. 6 is an illustration of the pixel domain image of FIG. 2 in which hidden data have been embedded in accordance with the modified histogram of FIG. 5;

FIG. 13 is an illustration of test results indicating peak signal to noise ratios (PSNR) and corresponding hidden data payload sizes for several test images in which hidden data have been embedded in accordance with one or more aspects of the present invention; and FIG. 14 is an illustration of comparisons between hidden data payload sizes for several embedding techniques, including that in accordance with one or more aspects of the present invention.

DETAILED DESCRIPTION OF THE INVENTION

Figure 1:
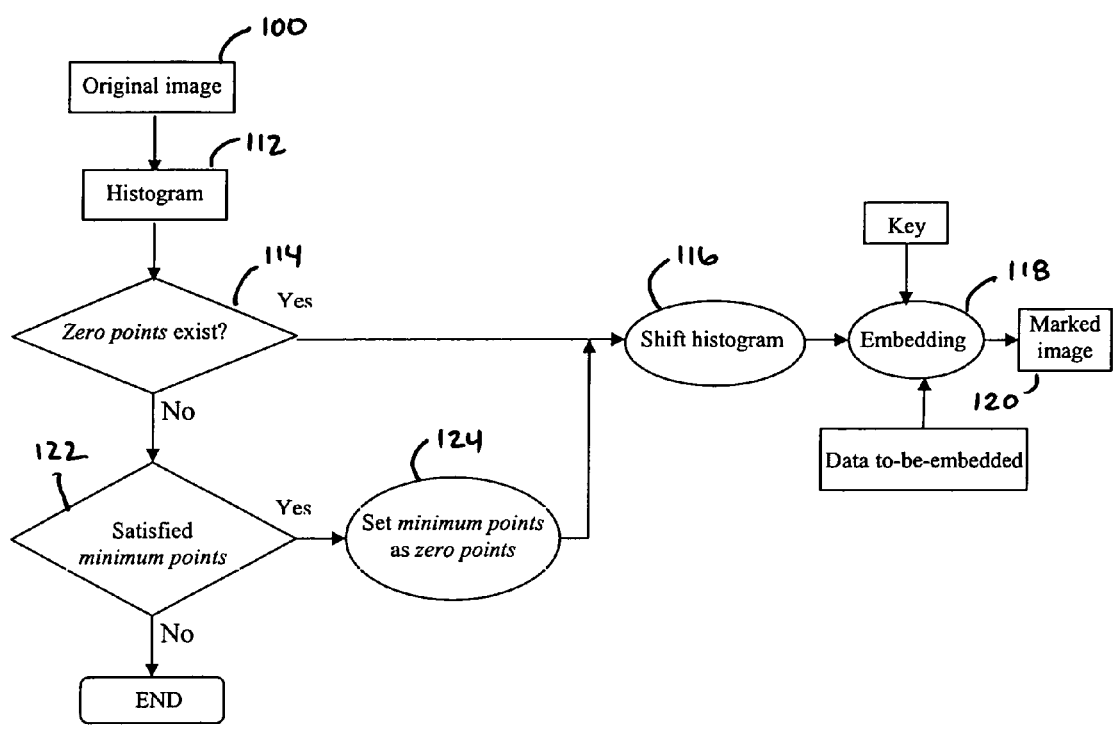
FIG. 1 is a flow chart of a data embedding (or encoding) method and apparatus for embedding hidden data in a pixel domain image in accordance with one or more aspects of the present invention.

In general, the present invention is directed to methods and apparatus for hiding (embedding) a relatively large amount of data in an image, where the original image may be recovered without any distortion from the marked image after the hidden data have been extracted. FIG. 1 is a flow diagram illustrating process steps that may be carried out to hide data in an image in accordance with one or more aspects of the present invention. It is noted that although FIG. 1 is a flow diagram of a preferred method, it may also enable apparatus for carrying out the actions of the method. Indeed, the disclosed method for marking images may be achieved utilizing suitable hardware, such as digital circuitry, analog circuitry, any of the known processors that are operable to execute software and/or firmware programs, one or more programmable digital devices or systems, such as programmable read only memories (PROMs), programmable array logic devices (PALs), any combination of the above, etc. Further, the present invention may be embodied in a software program that may be stored on any of the known or hereinafter developed media.

Figure 2:
FIG. 2 is an illustration of the original pixel domain image of FIG. 2 in which no hidden data have been embedded.
Figure 3:
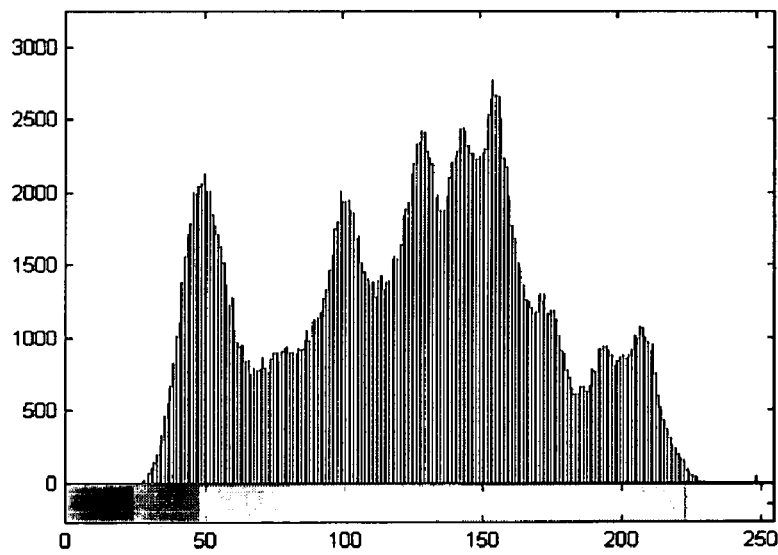
FIG. 3 is an illustration of an unmodified histogram of an original pixel domain image in accordance with one or more aspects of the present invention.

The process flow of FIG. 1 starts with obtaining an original, pixel domain (or spatial domain) image (action 100). By way of example the well known Lena image of FIG. 2 may be utilized, which a 512×512×8 gray scale image. Once an image is obtained, a histogram of the image is produced (action 102). The histogram establishes a relationship of possible pixel values versus respective aggregate numbers of pixels of the pixel domain image having such pixel values. By way of example, a histogram may be a collection (usually a graphical representation) of the gray scale values contained in an image. Alternatively, a histogram may be a collection of color values of an image. As illustrated in FIG. 3, one embodiment of a histogram for the Lena image of FIG. 2 may be a collection of the gray scale values arranged in a Cartesian coordinate system, e.g., with the gray scale (0-255) along an ordinate axis and the aggregate number of pixel values having a given gray scale along the abscissa axis. In this example, the gray scale value of 0 is black and the gray scale value of 255 is white.

Next, the histogram is analyzed to determine whether any zero points exist, i.e., where no pixel of the image has the corresponding gray scale value (action 114). If the result of the determination is in the affirmative, then the process flow advances to action 116. If the result of the determination at action 114 is in the negative, then the process flow advances to action 122 (which will be discussed later in this description). In the histogram of FIG. 3, a number of zero points exist, such as at the gray scale value of 255, where no pixel assumes that gray scale value. Thus, the process flow advances to action 116, where the histogram is shifted. To shift the histogram, a peak point is located, i.e., a gray scale value having a maximum number of pixel values. By way of example, a peak point exists at gray scale value 154. Next, the image is scanned in a defined order, e.g., row-by-row, from top to bottom, or column-by-column, from left to right, etc, . and certain pixel values are augmented by an amount (a shifting value) such that the gray scale values between the zero point and the peak point of the histogram are shifted.

The number and the direction of the shift will depend on the shifting value. For example, a shifting value of +1 added to all pixel values in the image above a selected value will shift the histogram to the right by one gray scale value. If the shifting value is +2, the histogram will be shifted to the right by two gray scale values, etc. On the other hand, a shifting value of −1 added to all pixel values in the image below a selected value will shift the histogram to the left by one gray scale value. If the shifting value is −2, the histogram will be shifted to the left by two gray scale values, etc.

The direction of the shift is preferably "two way" in that it is dependent on whether the gray scale value of the zero point is greater than or less than that of the peak point. For example, if the gray scale value of the zero point is greater than that of the peak point, then the shifting value is preferably a positive value (assuming the conventions discussed thus far), such as +1. This results in the histogram being shifted to the right by one place and opening up a gray scale value for which there are no associated pixel values. With reference to the Lena image of FIG. 2 and the histogram of FIG. 3 discussed above, the gray scale value of the zero point (255) is greater than that of the peak point (154). Thus, the gray scale values between the peak point and the zero point (non-inclusive) are shifted to the right by adding the shifting value (e.g., +1) to all of the pixel values of the histogram from gray scale value 155 to gray scale value 254. This leaves "empty" the gray scale value 155 of the histogram. The gray scale value of 155 may be considered an "embedded point."

On the other hand, if the gray scale value of the zero point is less than that of the peak point, then the shifting value is preferably a negative value (assuming the conventions discussed thus far), such as −1. This results in the histogram being shifted to the left by one place and opening up a gray scale value for which there are no associated pixel values. With reference to the Lena image of FIG. 2 and the histogram of FIG. 3 discussed above, assume a different gray scale value of the zero point of 20, which is less than that of the peak point (154). Thus, the gray scale values between the peak point and the zero point (non-inclusive) are shifted to the left by adding the shifting value (e.g., −1) to all of the pixel values of the histogram from gray scale value 153 to gray scale value 20. This leaves "empty" the gray scale value 153 of the histogram.

After the histogram is shifted, the process flow advances to action 118, where an embedding process is carried out. In this regard, the original image is again scanned (preferably in the same defined order in the shifting action 116). It is noted that although this scan need not be in the same defined order as in the shifting process, whatever scanning approach is employed will result in a particular order in which the peak points of the image are encountered. As this order should be reproducible during decoding, it is preferred that the scanning definition is consistent during the shifting action 116 and the embedding action 118. During the scan, when a pixel having a gray scale value of 154 is encountered, the data sequence to be embedded is analyzed. In particular, if the next bit of the data to be embedded in the sequence is "true," then the encountered pixel value of the image is augmented by the shifting value (e.g., +1 if the shift were to the right). It is noted that a true bit may be a binary 1 (making the false bit a binary 0 by implication), or the true bit may be a binary 0 (making the false bit a binary 1). Irrespective of the true/false convention, if the next bit of the data to be embedded in the sequence is false, then the encountered pixel value of the image is not augmented. This fills the "empty" gray scale value(s) of the histogram with pixel values taken from the peak point gray scale value.

This process of scanning the image for successive pixels having peak point gray scale values continues until all of the bits of the data to be embedded are encoded into the image. Reference is now made to FIG. 4, which is an example of data that may be hidden in the original pixel image in accordance with the process discussed above. The NJIT data of FIG. 4 is characterized by a binary sequence of 15,903 bits. An example of the resultant modified histogram for the Lena image of FIG. 2 (assuming use of the hidden of FIG. 4) is shown in FIG. 5, and the resultant modified pixel image is shown in FIG. 6.

It is noted that the gray scale value of the zero point and the peak point are treated as side information that needs to be transmitted to the receiving side for data retrieval.

It is noted that the objective of finding the peak point in the unmodified histogram is to maximize the embedding capacity of the process. Indeed, the capacity of the embedding process is equal to the maximum number of pixels associated with the peak point because each bit of the data to be embedded is associated with a respective one of the pixels of the peak gray scale value. While use of the peak point is preferred for the above reason, it is not a requirement to use the peak point to practice the invention. Indeed, if maximum data hiding capacity is not desired, then some other grey scale value (call it a "high point") may be used in place of the peak point.

Figure 7:
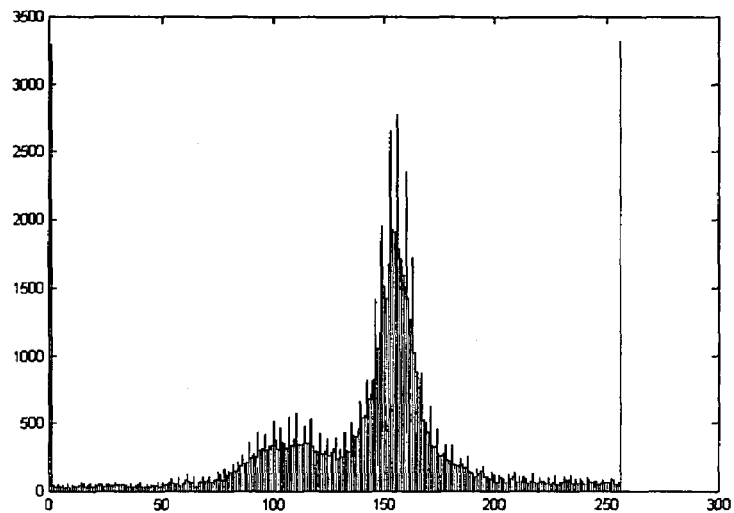
FIG. 7 is an illustration of an unmodified histogram of a different original pixel domain image in accordance with one or more aspects of the present invention.

Similarly, while use of the zero point is preferred, it is not a requirement to use the zero point to practice the invention. Depending on the original pixel image, there may not be any zero point, such as the image associated with the unmodified histogram of FIG. 7. This is the case where the result of the determination of action 114 (FIG. 1) is negative. Irrespective of whether there is or is not a zero point in the histogram, some other grey scale value (call it a "low point") may be used in place of the zero point (action 122). Preferably, if there is not zero point, the low point is a minimum point. For instance, in the histogram shown of FIG. 7, the gray scale value 7 is associated with only 23 pixels. This number of 23 is the minimum number since any other gray scale value is associated with more than 23 pixels. The gray scale value and the coordinates of pixels associated with the minimum point are recorded as overhead data, which may be included in the embedded data. In other respects, the minimum point may be used in the same way as the zero point discussed above (124).

It is considered an aspect of the invention to further increase the payload by employing multiple pairs of zero (or low) points and peak (or high) points. This scales the complexity of the algorithm. The scope of the experimentation performed thus far, however, has been limited to at most two pairs of zero points and peak points. For instance, an experiment involving the Lena image of FIG. 2 was conducted using two pairs of peak and zero points in order to achieve a payload of 5,460 bits in the 512×512×8, equivalent to 0.021 bpp as the PSNR is equal to 48.2 dB.

Figure 8:
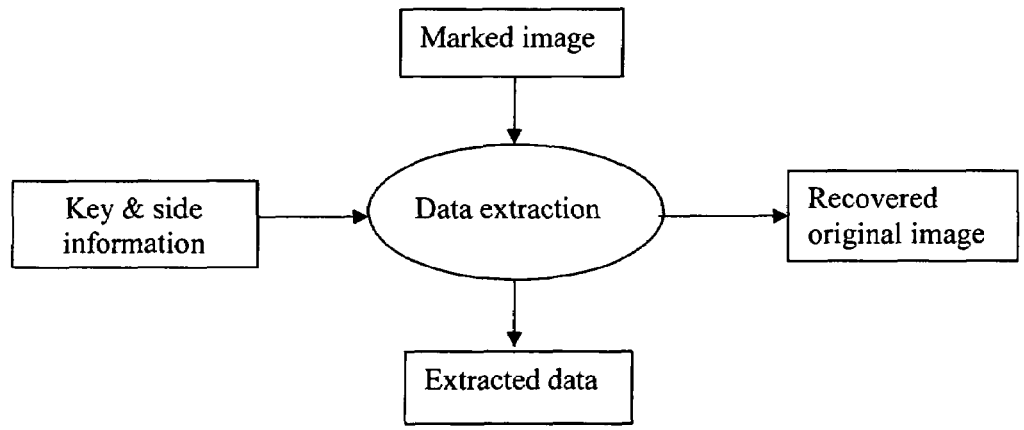
FIG. 8 is a block diagram of a data extraction (or decoding) method and apparatus for extracting embedded hidden data from the pixel domain image in accordance with one or more aspects of the present invention.

Reference is now made to FIG. 8, which is a flow diagram illustrating process steps that may be carried out to extract hidden data from an image in accordance with one or more further aspects of the present invention. It is noted that although FIG. 8 is a flow diagram of a preferred method, it may also enable apparatus for carrying out the actions of the method. Indeed, the disclosed method for extracting hidden data may be achieved utilizing suitable hardware, such as digital circuitry, analog circuitry, any of the known processors that are operable to execute software and/or firmware programs, one or more programmable digital devices or systems, such as programmable read only memories (PROMs), programmable array logic devices (PALs), any combination of the above, etc. Further, the present invention may be embodied in a software program that may be stored on any of the known or hereinafter developed media.

As shown in FIG. 8, the marked image, such as the marked Lena image of FIG. 6 is received at the decoder. The key and side information including the gray scale value of the zero point (255) and the peak point (154) were transmitted to the decoder for data extraction. The data extraction process produces both the hidden (extracted) data and the recovered original data, such as the Lena image of FIG. 2. The data extraction process (which for simplicity involves only one zero point and peak point pair) is as follows: The marked image is scanned using the same or equivalent definition as in the embedding process (118 of FIG. 1). When a gray scale value associated with the maximum point is encountered, e.g., 154, then a "false" value is assigned to the extracted data sequence. When a gray scale value associated with the "embedded point" is encountered, e.g., 155, then a "true" value is assigned to the extracted data sequence. In this way, the hidden data are extracted from the marked image.

Next, the marked image is scanned again using the same or equivalent definition as in the embedding process. When a pixel is encountered that has a gray scale value between the peak point (excluding the peak point) and the zero point (including the zero point), then the gray scale value of such pixel is augmented by an equal but opposite amount as the shifting value. For example, in the example above, the peak point was 255, the zero point was 154, and the shifting value was +1. Thus, when a pixel is encountered that has a gray scale value between 155 (including 155) and the zero point 255, then the gray scale value of such pixel is augmented by −1. In this way, the original image can be recovered without any distortion.

It is desirable to achieve high PSNR (peak signal to noise ratio) in the marked image. In the experimentation that has been conducted thus far, the PSNRs of the marked images have all been above 48 dB. This can be proved as follows: It is noted from the embedding algorithm that the pixels whose gray scale value is between the zero point and the peak point may be augmented by +/−1. Therefore, in the worst case, all pixels of the image will be added or subtracted by 1, implying that the mean square of errors is at most equal to one, i.e., MSE =1. Thus, the PSNR of a marked image versus the original image is bounded by 48.13 dB. That is, PSNR=10× $\log_{10}$(255×255/MSE)=48.13 dB. The conclusion that the lower bound of the PSNR of a marked image is 48.13 dB has been validated by numerous experiments and is believed to be much higher than all reversible data hiding techniques of the published prior art.

Figure 9:
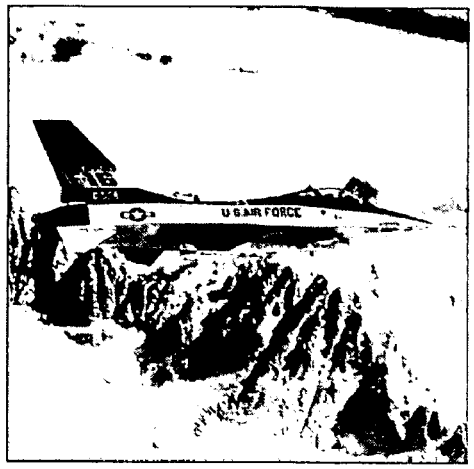
FIG. 9 is an illustration of a pixel domain image in which the hidden data of FIG. 4 have not been embedded.
Figure 10:
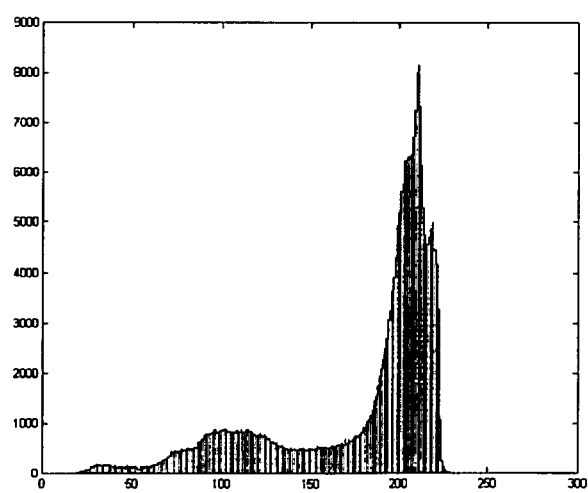
FIG. 10 is an illustration of an unmodified histogram of the pixel domain image of FIG. 9 in accordance with one or more aspects of the present invention.
Figure 11:
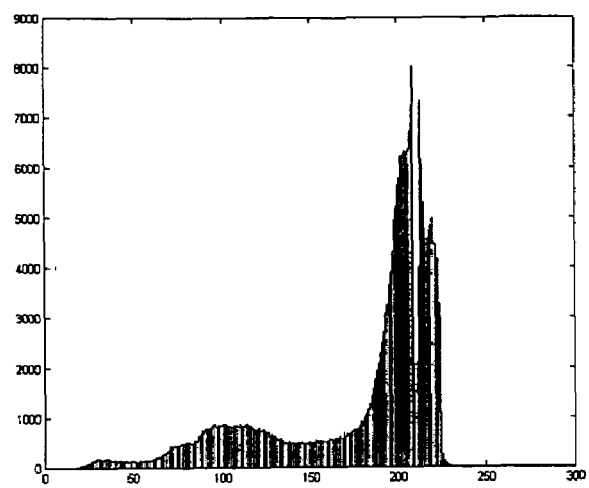
FIG. 11 is an illustration of a modified histogram of the pixel domain image of FIG. 9 in accordance with one or more aspects of the present invention.
Figure 12:
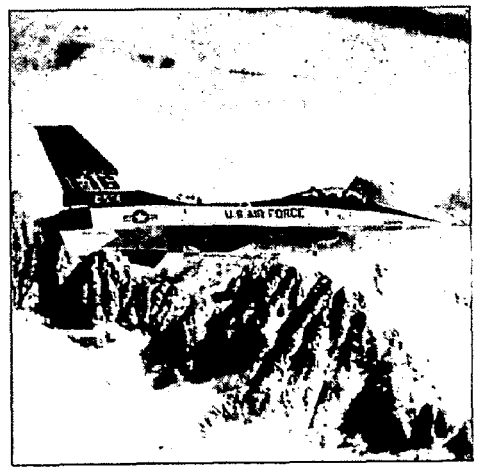
FIG. 12 is an illustration of the pixel domain image of FIG. 9 in which the hidden data of FIG. 8 have been embedded in accordance with one or more aspects of the present invention.

The proposed reversible data hiding algorithm has been applied to many typical grayscale images and medical images, and has demonstrated its universal capability. For example, the well known "Airplane" image (512×512×8) of FIG. 9, having a histogram shown in FIG. 10 was modified to include the hidden data of FIG. 4 (a binary sequence of 15,903 bits). FIGS. 11 and 12 illustrate the modified histogram and marked Airplane image, respectively. The gray scale values of two zero points are 0 and 255, respectively, and the gray scale values of two peak points are 210 and 211, respectively. The numbers of pixels associated with these two peak points are 8,016 and 8,155, respectively. Hence, the capacity is 8,016+ 8,155=16,171 bits.

FIG. 13 is a table illustrating further test results indicating peak signal to noise ratios (PSNR) and corresponding hidden data payload sizes for several test images in which hidden data have been embedded in accordance with one or more aspects of the present invention. FIG. 14 is an illustration of comparisons between hidden data payload sizes for several embedding techniques, including that in accordance with one or more aspects of the present invention.

The reversible data hiding technique of the present invention is able to embed about 5k-80k bits into a 512×512×8 grayscale image while keeping the PSNR constantly above 48 dB. Thus, the performance of the invention is better than most existing reversible data hiding algorithms. The techniques of the present invention may be applied to virtually all types of images and may be deployed for a wide range of applications in areas such as medical and law enforcement. In fact, it has been successfully applied to more than 1000 images in CorelDraw image database. Advantageously, various aspects of the present invention permit the hiding (embedding) of a relatively large amount of data in an image, where the original image may be recovered without distortion from the marked image after the hidden data have been extracted.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
  producing a histogram from a pixel domain image, the histogram establishing a relationship of possible pixel values versus respective aggregate numbers of pixels of the pixel domain image having such pixel values;
  modifying some of the pixel values of the pixel domain image to shift a portion of the histogram such that there no longer exists an aggregate number of pixels having a first possible pixel value; and
  modifying some of the pixel values of the pixel domain image such that an aggregate number of pixels exist having the first possible pixel value, where the aggregate number of pixels is a function of data to be hidden.

2. The method of claim 1, wherein the first possible pixel value is at or proximate to a target possible pixel value, the target possible pixel value being selected based on an aggregate number of pixels having the target possible pixel value.

3. The method of claim 2, wherein the target possible pixel value is selected when the aggregate number of pixels associated therewith is at least one of (i) a maximum number, (ii) a maxima, and (iii) above a threshold number, in the histogram prior to shifting.

4. The method of claim 2, wherein:
  the pixel values of the pixel domain image are modified to shift the histogram from the first possible pixel value toward a second possible pixel value; and
  the second possible pixel value is selected when an aggregate number of pixels associated therewith is at least one of (i) a minimum number, (ii) a minima, and (iii) below a threshold number, in the histogram prior to shifting.

5. The method of claim 4, wherein the second possible pixel value is selected based on its aggregate number of pixels being zero in the histogram prior to shifting.

6. The method of claim 2, further comprising offsetting each pixel value of the pixel domain image falling between the first possible pixel value, inclusive, and a second possible pixel value, exclusive, by a shifting value such that the histogram shifts from the first possible pixel value toward the second possible pixel value.

7. The method of claim 6, wherein at least one of:
  the shifting value is positive when the first possible pixel value is less than the second possible pixel value;
  the shifting value is negative when the first possible pixel value is greater than the second possible pixel value; and
  the shifting value is +/−1.

8. The method of claim 1, further comprising:
  a) expressing the data to be hidden in the pixel domain image as a series of true and false logic values;
  b) associating each true logic value of the data to be hidden with one of the pixel values of the pixel domain image; and
  c) modifying the pixel values of the pixel domain image that are associated with true logic values of the data to be hidden such that they have the first possible pixel value.

9. The method of claim 1, further comprising:
  a) expressing the data to be hidden in the pixel domain image as a series of true and false logic values;
  b) scanning at least some of the pixel values of the pixel domain image for pixel values of a target possible pixel value, the target possible pixel value being at or proximate to the first possible pixel value; and
  c) offsetting each of the scanned pixel values of the pixel domain image by a first encoding value when a next logic value of the data to be hidden is true, and by a second encoding value when the next logic value of the data to be hidden is false.

10. The method of claim 9, further comprising repeating at least one of b) or c) until all of the true or false logic values of the data to be hidden are encoded into the pixel domain image.

11. The method of claim 9, wherein the true value is a logic 1, the false value is a logic 0, the first encoding value is +/−1, and the second encoding value is zero.

12. A method of decoding a pixel domain image containing hidden data, the pixel domain image having been encoded with the hidden data by (i) producing a histogram, the histogram establishing a relationship of possible pixel values versus respective aggregate numbers of pixels of the pixel domain image having such pixel values; (ii) modifying some of the pixel values of the pixel domain image to shift a portion of the histogram such that there no longer exists an aggregate number of pixels having a first possible pixel value; and (iii) modifying some of the pixel values of the pixel domain image such that an aggregate number of pixels exist having the first possible pixel value, where the aggregate number of pixels is a function of the hidden data, the method comprising:
  using the modified pixel values of the pixel domain image having the first possible pixel value to recover at least a portion of the hidden data.

13. The method of claim 12, wherein:
  the pixel domain image has been encoded with the hidden data by a) expressing the hidden data as a series of true and false logic values, b) associating each true logic value of the hidden data with one of the pixel values of the pixel domain image, and c) modifying the pixel values of the pixel domain image that are associated with true logic values of the hidden data such that they have the first possible pixel value; and the method further comprises extracting a true logic value of the hidden data based on each pixel value of the pixel domain image having a value equal to the first possible pixel value.

14. The method of claim 12, wherein:

the pixel domain image has been encoded with the hidden data by a) expressing the hidden data in the pixel domain image as a series of true and false logic values, b) scanning at least some of the pixel values of the pixel domain image for pixel values of a target possible pixel value, the target possible pixel value being at or proximate to the first possible pixel value, and c) offsetting each of the scanned pixel values of the pixel domain image by a first encoding value when a next logic value of the hidden data is true, and by a second encoding value when the next logic value of the hidden data is false; and the method further comprises:

scanning the at least some of the pixel values of the pixel domain image in the same order as in b);

assigning a true logic level to an extracted hidden data sequence each time a scanned pixel value is equal to the target possible pixel value offset by the first encoding value; and assigning a false logic level to the extracted hidden data sequence each time a scanned pixel value is equal to the target possible pixel value offset by the second encoding value.

15. The method of claim 14, wherein the true value is a logic 1, the false value is a logic 0, the first encoding value is +/−1, and the second encoding value is zero.

16. The method of claim 14, wherein:

the pixel domain image has been encoded with the hidden data by offsetting each pixel value of the pixel domain image falling between the first possible pixel value, inclusive, and a second possible pixel value, exclusive, by a shifting value such that the histogram shifts from the first possible pixel value toward the second possible pixel value, prior to c); and the method further comprises offsetting each pixel value of the pixel domain image falling between the first possible pixel value, inclusive, and a second possible pixel value, inclusive, by an equal but opposite shifting value such that the histogram shifts from the second possible pixel value toward the first possible pixel value.

17. The method of claim 16, wherein at least one of:

the shifting value equals the first encoding value;

the shifting value is positive when the first possible pixel value is less than the second possible pixel value;

the shifting value is negative when the first possible pixel value is greater than the second possible pixel value; and the shifting value is +/−1.

18. An apparatus including a processor operating under the instructions of a software program, the software program causing the apparatus to perform actions, comprising:

producing a histogram from a pixel domain image, the histogram establishing a relationship of possible pixel values versus respective aggregate numbers of pixels of the pixel domain image having such pixel values;

modifying some of the pixel values of the pixel domain image to shift a portion of the histogram such that there no longer exists an aggregate number of pixels having a first possible pixel value; and modifying some of the pixel values of the pixel domain image such that an aggregate number of pixels exist having the first possible pixel value, where the aggregate number of pixels is a function of data to be hidden.

19. The apparatus of claim 18, wherein the first possible pixel value is at or proximate to a target possible pixel value, the target possible pixel value being selected based on an aggregate number of pixels having the target possible pixel value.

20. The apparatus of claim 19, wherein the target possible pixel value is selected when the aggregate number of pixels associated therewith is at least one of (i) a maximum number, (ii) a maxima, and (iii) above a threshold number, in the histogram prior to shifting.

21. The apparatus of claim 19, wherein:

the pixel values of the pixel domain image are modified to shift the histogram from the first possible pixel value toward a second possible pixel value; and the second possible pixel value is selected when an aggregate number of pixels associated therewith is at least one of (i) a minimum number, (ii) a minima, and (iii) below a threshold number, in the histogram prior to shifting.

22. The apparatus of claim 21, wherein the second possible pixel value is selected based on its aggregate number of pixels being zero in the histogram prior to shifting.

23. The apparatus of claim 22, further comprising offsetting each pixel value of the pixel domain image falling between the first possible pixel value, inclusive, and a second possible pixel value, exclusive, by a shifting value such that the histogram shifts from the first possible pixel value toward the second possible pixel value.

24. The apparatus of claim 23, wherein at least one of:

the shifting value is positive when the first possible pixel value is less than the second possible pixel value;

the shifting value is negative when the first possible pixel value is greater than the second possible pixel value; and the shifting value is +/−1.

25. The apparatus of claim 18, further comprising:

a) expressing the data to be hidden in the pixel domain image as a series of true and false logic values;

b) associating each true logic value of the data to be hidden with one of the pixel values of the pixel domain image; and c) modifying the pixel values of the pixel domain image that are associated with true logic values of the data to be hidden such that they have the first possible pixel value.

26. The apparatus of claim 18, further comprising:

a) expressing the data to be hidden in the pixel domain image as a series of true and false logic values;

b) scanning at least some of the pixel values of the pixel domain image for pixel values of a target possible pixel value, the target possible pixel value being at or proximate to the first possible pixel value; and c) offsetting each of the scanned pixel values of the pixel domain image by a first encoding value when a next logic value of the data to be hidden is true, and by a second encoding value when the next logic value of the data to be hidden is false.

27. The apparatus of claim 26, farther comprising repeating at least one of b) or c) until all of the true or false logic values of the data to be hidden are encoded into the pixel domain image.

28. The apparatus of claim 26, wherein the true value is a logic 1, the false value is a logic 0, the first encoding value is +/−1, and the second encoding value is zero.

29. An apparatus for decoding a pixel domain image containing hidden data, the pixel domain image having been encoded with the hidden data by (i) producing a histogram, the histogram establishing a relationship of possible pixel values versus respective aggregate numbers of pixels of the pixel domain image having such pixel values; (ii) modifying some of the pixel values of the pixel domain image to shift a portion of the histogram such that there no longer exists an aggregate number of pixels having a first possible pixel value; and (iii) modifying some of the pixel values of the pixel domain image such that an aggregate number of pixels exist having the first possible pixel value, where the aggregate number of pixels is a function of the hidden data, the apparatus including a processor operating under the instructions of a software program, the software program causing the apparatus to perform actions, comprising:

using the modified pixel values of the pixel domain image having the first possible pixel value to recover at least a portion of the hidden data.

30. The apparatus of claim 29, wherein:
the pixel domain image has been encoded with the hidden data by a) expressing the hidden data as a series of true and false logic values, b) associating each true logic value of the hidden data with one of the pixel values of the pixel domain image, and c) modifying the pixel values of the pixel domain image that are associated with true logic values of the hidden data such that they have the first possible pixel value; and
the actions further comprise extracting a true logic value of the hidden data based on each pixel value of the pixel domain image having a value equal to the first possible pixel value.

31. The apparatus of claim 29, wherein:
the pixel domain image has been encoded with the hidden data by a) expressing the hidden data in the pixel domain image as a series of true and false logic values, b) scanning at least some of the pixel values of the pixel domain image for pixel values of a target possible pixel value, the target possible pixel value being at or proximate to the first possible pixel value, and c) offsetting each of the scanned pixel values of the pixel domain image by a first encoding value when a next logic value of the hidden data is true, and by a second encoding value when the next logic value of the hidden data is false; and
the actions further comprise:
scanning the at least some of the pixel values of the pixel domain image in the same order as in b);
assigning a true logic level to an extracted hidden data sequence each time a scanned pixel value is equal to the target possible pixel value offset by the first encoding value; and
assigning a false logic level to the extracted hidden data sequence each time a scanned pixel value is equal to the target possible pixel value offset by the second encoding value.

32. The apparatus of claim 31, wherein the true value is a logic 1, the false value is a logic 0, the first encoding value is +/−1, and the second encoding value is zero.

33. The apparatus of claim 31, wherein:
the pixel domain image has been encoded with the hidden data by offsetting each pixel value of the pixel domain image falling between the first possible pixel value, inclusive, and a second possible pixel value, exclusive, by a shifting value such that the histogram shifts from the first possible pixel value toward the second possible pixel value, prior to c); and
the actions further comprise offsetting each pixel value of the pixel domain image falling between the first possible pixel value, inclusive, and a second possible pixel value, inclusive, by an equal but opposite shifting value such that the histogram shifts from the second possible pixel value toward the first possible pixel value.

34. The apparatus of claim 33, wherein at least one of:
the shifting value equals the first encoding value;
the shifting value is positive when the first possible pixel value is less than the second possible pixel value;
the shifting value is negative when the first possible pixel value is greater than the second possible pixel value; and
the shifting value is +/−1.

35. A computer-readable medium containing software instructions that, when executed by a processor, cause the processor to implement a method comprising:
producing a histogram from a pixel domain image, the histogram establishing a relationship of possible pixel values versus respective aggregate numbers of pixels of the pixel domain image having such pixel values;
modifying some of the pixel values of the pixel domain image to shift a portion of the histogram such that there no longer exists an aggregate number of pixels having a first possible pixel value; and
modifying some of the pixel values of the pixel domain image such that an aggregate number of pixels exist having the first possible pixel value, where the aggregate number of pixels is a function of data to be hidden.

36. The medium of claim 35, wherein the first possible pixel value is at or proximate to a target possible pixel value, the target possible pixel value being selected based on an aggregate number of pixels having the target possible pixel value.

37. The medium of claim 36, wherein the target possible pixel value is selected when the aggregate number of pixels associated therewith is at least one of (i) a maximum number, (ii) a maxima, and (iii) above a threshold number, in the histogram prior to shifting.

38. The medium of claim 36, wherein:
the pixel values of the pixel domain image are modified to shift the histogram from the first possible pixel value toward a second possible pixel value; and
the second possible pixel value is selected when an aggregate number of pixels associated therewith is at least one of (i) a minimum number, (ii) a minima, and (iii) below a threshold number, in the histogram prior to shifting.

39. The medium of claim 38, wherein the second possible pixel value is selected based on its aggregate number of pixels being zero in the histogram prior to shifting.

40. The medium of claim 36, wherein the method further comprises:
offsetting each pixel value of the pixel domain image falling between the first possible pixel value, inclusive, and a second possible pixel value, exclusive, by a shifting value such that the histogram shifts from the first possible pixel value toward the second possible pixel value.

41. The medium of claim 40, wherein at least one of:
the shifting value is positive when the first possible pixel value is less than the second possible pixel value;
the shifting value is negative when the first possible pixel value is greater than the second possible pixel value; and
the shifting value is +/−1.

42. The medium of claim 35, wherein the method further comprises:
a) expressing the data to be hidden in the pixel domain image as a series of true and false logic values;
b) associating each true logic value of the data to be hidden with one of the pixel values of the pixel domain image; and c) modifying the pixel values of the pixel domain image that are associated with true logic values of the data to be hidden such that they have the first possible pixel value.

43. The medium of claim 35, wherein the method further comprises:
   a) expressing the data to be hidden in the pixel domain image as a series of true and false logic values;
   b) scanning at least some of the pixel values of the pixel domain image for pixel values of a target possible pixel value, the target possible pixel value being at or proximate to the first possible pixel value; and
   c) offsetting each of the scanned pixel values of the pixel domain image by a first encoding value when a next logic value of the data to be hidden is true, and by a second encoding value when the next logic value of the data to be hidden is false.

44. The medium of claim 43, wherein the method further comprises:
   repeating at least one of b) or c) until all of the true or false logic values of the data to be hidden are encoded into the pixel domain image.

45. The medium of claim 43, wherein the true value is a logic 1, the false value is a logic 0, the first encoding value is +/−1, and the second encoding value is zero.

46. A computer-readable medium containing software instructions that, when executed by a processor, cause the processor to implement a method of decoding a pixel domain image containing hidden data, the pixel domain image having been encoded with the hidden data by (i) producing a histogram, the histogram establishing a relationship of possible pixel values versus respective aggregate numbers of pixels of the pixel domain image having such pixel values; (ii) modifying some of the pixel values of the pixel domain image to shift a portion of the histogram such that there no longer exists an aggregate number of pixels having a first possible pixel value; and (iii) modifying some of the pixel values of the pixel domain image such that an aggregate number of pixels exist having the first possible pixel value, where the aggregate number of pixels is a function of the hidden data, the method comprising:
   using the modified pixel values of the pixel domain image having the first possible pixel value to recover at least a portion of the hidden data.

47. The medium of claim 46, wherein:
   the pixel domain image has been encoded with the hidden data by a) expressing the hidden data as a series of true and false logic values, b) associating each true logic value of the hidden data with one of the pixel values of the pixel domain image, and c) modifying the pixel values of the pixel domain image that are associated with true logic values of the hidden data such that they have the first possible pixel value; and
   the method further comprises extracting a true logic value of the hidden data based on each pixel value of the pixel domain image having a value equal to the first possible pixel value.

48. The medium of claim 47, wherein:
   the pixel domain image has been encoded with the hidden data by a) expressing the hidden data in the pixel domain image as a series of true and false logic values, b) scanning at least some of the pixel values of the pixel domain image for pixel values of a target possible pixel value, the target possible pixel value being at or proximate to the first possible pixel value, and c) offsetting each of the scanned pixel values of the pixel domain image by a first encoding value when a next logic value of the hidden data is true, and by a second encoding value when the next logic value of the hidden data is false; and
   the method further comprises:
   scanning the at least some of the pixel values of the pixel domain image in the same order as in b);
   assigning a true logic level to an extracted hidden data sequence each time a scanned pixel value is equal to the target possible pixel value offset by the first encoding value; and
   assigning a false logic level to the extracted hidden data sequence each time a scanned pixel value is equal to the target possible pixel value offset by the second encoding value.

49. The medium of claim 38, wherein the true value is a logic 1, the false value is a logic 0, the first encoding value is +/−1, and the second encoding value is zero.

50. The medium of claim 38, wherein:
   the pixel domain image has been encoded with the hidden data by offsetting each pixel value of the pixel domain image falling between the first possible pixel value, inclusive, and a second possible pixel value, exclusive, by a shifting value such that the histogram shifts from the first possible pixel value toward the second possible pixel value, prior to c); and
   the method further comprises offsetting each pixel value of the pixel domain image falling between the first possible pixel value, inclusive, and a second possible pixel value, inclusive, by an equal but opposite shifting value such that the histogram shifts from the second possible pixel value toward the first possible pixel value.

51. The medium of claim 50, wherein at least one of:
   the shifting value equals the first encoding value;
   the shifting value is positive when the first possible pixel value is less than the second possible pixel value;
   the shifting value is negative when the first possible pixel value is greater than the second possible pixel value; and
   the shifting value is +/−1.

* * * * *